(12) United States Patent
Ramasamy et al.

(10) Patent No.: US 12,333,345 B2
(45) Date of Patent: Jun. 17, 2025

(54) TASK ALLOCATION ACROSS PROCESSING UNITS OF A DISTRIBUTED SYSTEM

(71) Applicant: Goldman Sachs & Co. LLC, New York, NY (US)

(72) Inventors: Dhushyanth Ramasamy, Plainsboro, NJ (US); Richard Tarling, Hoboken, NJ (US)

(73) Assignee: Goldman Sachs & Co. LLC, New York, NY (US)

( * ) Notice: Subject to any disclaimer, the term of this patent is extended or adjusted under 35 U.S.C. 154(b) by 689 days.

(21) Appl. No.: 17/576,884

(22) Filed: Jan. 14, 2022

(65) Prior Publication Data

US 2023/0229519 A1 Jul. 20, 2023

(51) Int. Cl.
*G06F 9/50* (2006.01)

(52) U.S. Cl.
CPC .......... *G06F 9/5066* (2013.01); *G06F 9/5038* (2013.01); *G06F 9/505* (2013.01)

(58) Field of Classification Search
None
See application file for complete search history.

(56) References Cited

U.S. PATENT DOCUMENTS

| | | | | |
|---|---|---|---|---|
| 5,881,283 A * | 3/1999 | Hondou | ................. | G06F 9/4881 718/100 |
| 6,101,460 A * | 8/2000 | Brinkerhoff | ..... | G06Q 10/06315 702/179 |
| 6,125,394 A * | 9/2000 | Rabinovich | ............... | H04L 9/40 711/134 |
| 6,351,775 B1 * | 2/2002 | Yu | ........................ | H04L 67/1038 709/239 |
| 8,108,258 B1 * | 1/2012 | Slattery | ................ | G06Q 20/207 705/31 |
| 8,909,619 B1 * | 12/2014 | Riley | ..................... | G06F 16/957 707/722 |
| 9,477,523 B1 * | 10/2016 | Warman | ................ | G06F 9/5038 |
| 9,524,330 B1 * | 12/2016 | Allocca | ............... | G06Q 30/0635 |
| 10,152,349 B1 * | 12/2018 | Anand | ................... | G06N 20/00 |
| 10,158,709 B1 * | 12/2018 | Muniswamy-Reddy | ..................... | G06F 16/252 |
| 10,303,384 B1 * | 5/2019 | Agarwal | ............... | G06F 3/0604 |
| 10,862,821 B1 * | 12/2020 | Jonsson | ................... | H04L 67/10 |
| 2005/0169254 A1 * | 8/2005 | Kurita | ................. | H04L 67/1023 370/352 |
| 2006/0026219 A1 * | 2/2006 | Orenstein | ........... | G06F 11/2097 |
| 2006/0056693 A1 * | 3/2006 | Yamazaki | ............. | G06F 9/3814 382/173 |
| 2006/0074925 A1 * | 4/2006 | Bixby | ..................... | G06F 16/10 |
| 2006/0075176 A1 * | 4/2006 | Okamoto | ................ | G06F 3/061 710/305 |

(Continued)

*Primary Examiner* — Adam Lee
(74) *Attorney, Agent, or Firm* — Fenwick & West LLP

(57) ABSTRACT

An organization's distributed data storage and processing system produces an enormous volume of source data (such as log files or other statistics). The organization uses a data item processing system to process the source data in prioritized chunks, and to further assign the data items within the chunks to different processing units based on estimates of processing completion time. In this way, it becomes feasible to process the source data for analysis by consumer clients within a reasonable amount of time, and the aggregate use of the processing units is made more efficient.

20 Claims, 2 Drawing Sheets

(56) References Cited

U.S. PATENT DOCUMENTS

| | | | |
|---|---|---|---|
| 2006/0270414 A1* | 11/2006 | Veerasamy | H04W 28/0967 455/453 |
| 2007/0061521 A1* | 3/2007 | Kelly | G06F 9/544 711/147 |
| 2007/0174831 A1* | 7/2007 | Lee | G06F 9/505 717/174 |
| 2008/0080515 A1* | 4/2008 | Tombroff | H04L 67/1001 370/394 |
| 2008/0184248 A1* | 7/2008 | Barua | G06F 9/5027 718/104 |
| 2008/0208893 A1* | 8/2008 | Bhagwan | G06F 16/10 |
| 2008/0270978 A1* | 10/2008 | Leung | G06F 9/451 707/999.102 |
| 2009/0064159 A1* | 3/2009 | LaFrese | G06F 3/0686 718/104 |
| 2009/0150548 A1* | 6/2009 | Smith | H04L 67/1031 709/226 |
| 2009/0193436 A1* | 7/2009 | Du | G06F 11/321 719/318 |
| 2010/0262971 A1* | 10/2010 | Yamada | G06F 9/505 718/104 |
| 2011/0212761 A1* | 9/2011 | Paulsen | G07F 17/3202 345/522 |
| 2011/0225298 A1* | 9/2011 | Brown | G06F 9/505 709/226 |
| 2012/0002733 A1* | 1/2012 | Misra | H04W 52/0219 375/259 |
| 2012/0042322 A1* | 2/2012 | Arvidsson | G06F 9/5088 718/105 |
| 2012/0044532 A1* | 2/2012 | Takahasi | H04L 67/1008 358/1.15 |
| 2012/0089909 A1* | 4/2012 | Block | G06Q 10/06 715/764 |
| 2012/0272041 A1* | 10/2012 | Vance | G06F 16/254 712/E9.016 |
| 2012/0311099 A1* | 12/2012 | Yoshida | G06F 16/1837 709/219 |
| 2013/0070294 A1* | 3/2013 | Mochizuki | G06F 3/1285 358/1.15 |
| 2013/0138886 A1* | 5/2013 | Yamauchi | G06F 9/544 711/120 |
| 2013/0185705 A1* | 7/2013 | Kuesel | G06F 9/44542 719/331 |
| 2013/0191839 A1* | 7/2013 | Ishikawa | G06F 9/5033 718/104 |
| 2013/0262905 A1* | 10/2013 | Yamauchi | G06F 9/4887 713/340 |
| 2013/0290957 A1* | 10/2013 | Li | G06F 9/5066 718/1 |
| 2013/0311727 A1* | 11/2013 | Yamauchi | G06F 15/7807 711/149 |
| 2013/0318525 A1* | 11/2013 | Palanisamy | G06F 9/5066 718/1 |
| 2013/0339977 A1* | 12/2013 | Dennis | G06F 9/5088 718/105 |
| 2014/0047454 A1* | 2/2014 | Oliver | G06F 9/5088 718/104 |
| 2014/0101226 A1* | 4/2014 | Khandekar | H04L 67/56 709/203 |
| 2015/0036175 A1* | 2/2015 | Yun | G06F 3/1288 358/1.15 |
| 2015/0089062 A1* | 3/2015 | Reiter | G06F 9/505 709/226 |
| 2015/0278371 A1* | 10/2015 | Anand | G06F 16/9038 707/723 |
| 2016/0085587 A1* | 3/2016 | Dube | G06F 9/4881 718/104 |
| 2016/0092452 A1* | 3/2016 | Wang | G06V 20/54 707/752 |
| 2016/0241595 A1* | 8/2016 | Molloy | H04L 63/1408 |
| 2016/0315862 A1* | 10/2016 | Shum | H04L 47/125 |
| 2016/0342661 A1* | 11/2016 | Kumarasamy | G06F 16/2264 |
| 2017/0041538 A1* | 2/2017 | Choi | G06F 3/0346 |
| 2017/0083588 A1* | 3/2017 | Lang | G06F 16/24526 |
| 2017/0193389 A1* | 7/2017 | Thomas | G06N 20/00 |
| 2017/0318082 A1* | 11/2017 | Thakur | G06F 9/505 |
| 2018/0060341 A1* | 3/2018 | Wu | G06F 16/148 |
| 2018/0097875 A1* | 4/2018 | Zou | H04L 67/1008 |
| 2018/0101399 A1* | 4/2018 | Jain | G06F 9/485 |
| 2018/0260746 A1* | 9/2018 | Xiong | G06F 40/40 |
| 2018/0293111 A1* | 10/2018 | Chen | H04L 67/1008 |
| 2018/0302328 A1* | 10/2018 | Keith | H04L 43/16 |
| 2018/0374008 A1* | 12/2018 | Sinha | G06Q 30/0202 |
| 2019/0104173 A1* | 4/2019 | Yamazaki | G06F 9/505 |
| 2020/0133804 A1* | 4/2020 | Du | G06F 11/2082 |
| 2020/0267211 A1* | 8/2020 | Nagai | H04L 67/1008 |
| 2021/0048798 A1* | 2/2021 | Bulanda | H04J 3/0661 |
| 2021/0263771 A1* | 8/2021 | Zhu | G06F 11/3452 |
| 2022/0067123 A1* | 3/2022 | Rafey | G06N 3/08 |
| 2022/0092061 A1* | 3/2022 | Cheng | G06F 16/248 |
| 2024/0134710 A1* | 4/2024 | Urasawa | G06F 9/5066 |

* cited by examiner

TASK ALLOCATION ACROSS PROCESSING UNITS OF A DISTRIBUTED SYSTEM

FIELD OF ART

This disclosure relates generally to the field of electronic data processing, and more specifically, to task allocation across processing units to improve processor utilization and decrease processing latency.

BACKGROUND

Many companies or other organizations generate enormous amounts of data, such as multiple terabytes each day of log files or other statistics. The organizations typically have a number of clients—whether internal or external—that wish to make use of the generated data. For example, a financial services company might generate several terabytes of asset trading statistics each day across the different systems of its cloud computing systems or its own data center, with executives within the company wishing to analyze aggregate trading volume, internal data scientists wishing to obtain data about failed trades for the generation of models to flag such trades in future, and the like. However, the sheer volume of the generated data makes it infeasible to analyze in a timely manner, to process efficiently, or even to load the data into memory all at once.

SUMMARY

An organization has a distributed data storage and processing system—such as an on-premises data center, or a cloud-based system such as those provided by Amazon Web Services™, Microsoft Azure™, or Google Cloud™—that the organization uses to carry out its operations. The data storage and processing system contains a number of distributed processing units, such as physical computing systems or virtual computing systems connected over a computer network. In the course of performing its operations, the organization generates or otherwise obtains a set of source data comprising a set of distinct data items, each data item representing a distinct unit of information. For example, an organization conducting financial services might have many log files storing the execution status of different financial trades, with each log file being a data item. Although each data item may be small, in the aggregate the source data can be enormous, such as many petabytes of data accumulated over time from several terabytes of data generated per day.

The organization may have many consumer clients—either internal or external to the organization, or both—that wish to analyze or otherwise process the source data. For example, in the case of a financial services company, one internal consumer might be executives or other managers wishing to determine a total number of financial trades over a recent time period, and another internal consumer might be data scientists of the organization who wish to create machine learning models to flag suspect trades. Continuing the example, an external consumer might be industry analysts wishing to gain aggregate statistics about trading volumes that the organization makes publicly available.

Since it may be completely infeasible to load all the source data into memory, and in any case might take years to process all the source data, the organization uses a data item processing system that processes the source data in meaningful chunks (that is, sets of data items), producing processed output data from portions of the source data of higher presumed importance to the consumer clients sooner than processed output data from portions of the source data of lesser presumed importance. The chunks are formed according to values of a chunking attribute serving as a likely indicator of the importance of the data items to the consumer clients. The values of the chunking attribute can be arranged in an ordered sequence, indicating presumed importance of the corresponding data items to consumer clients. In some embodiments the chunking attribute is compound, i.e., having a value derived from a number of other attributes. Within each chunk, the data items are assigned to processing units using a data item completion time attribute, which serves as a proxy for an expected amount of time or processing operations required to process the data item. This distributes the task of processing more evenly across all the available processing units, thereby making more efficient overall use of system resources.

As one specific example from one embodiment, the data items are log files, and the chunking attribute is the date-time of log file creation, with more recent chunks being processed before less recent chunks. The data item completion time attribute in turn can be the size of the log file (e.g., in bytes).

The data item processing system produces data for the use of consumer clients earlier, and with greater relevance, than it would if it processed the data all at once in batch mode. Additionally, its allocation of data items to processing units makes more efficient use of the processing pool than other approaches such as random assignment to available processing units. Greater efficiency also leads to cost savings in environments such as cloud computing, in which computation has a direct cost.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
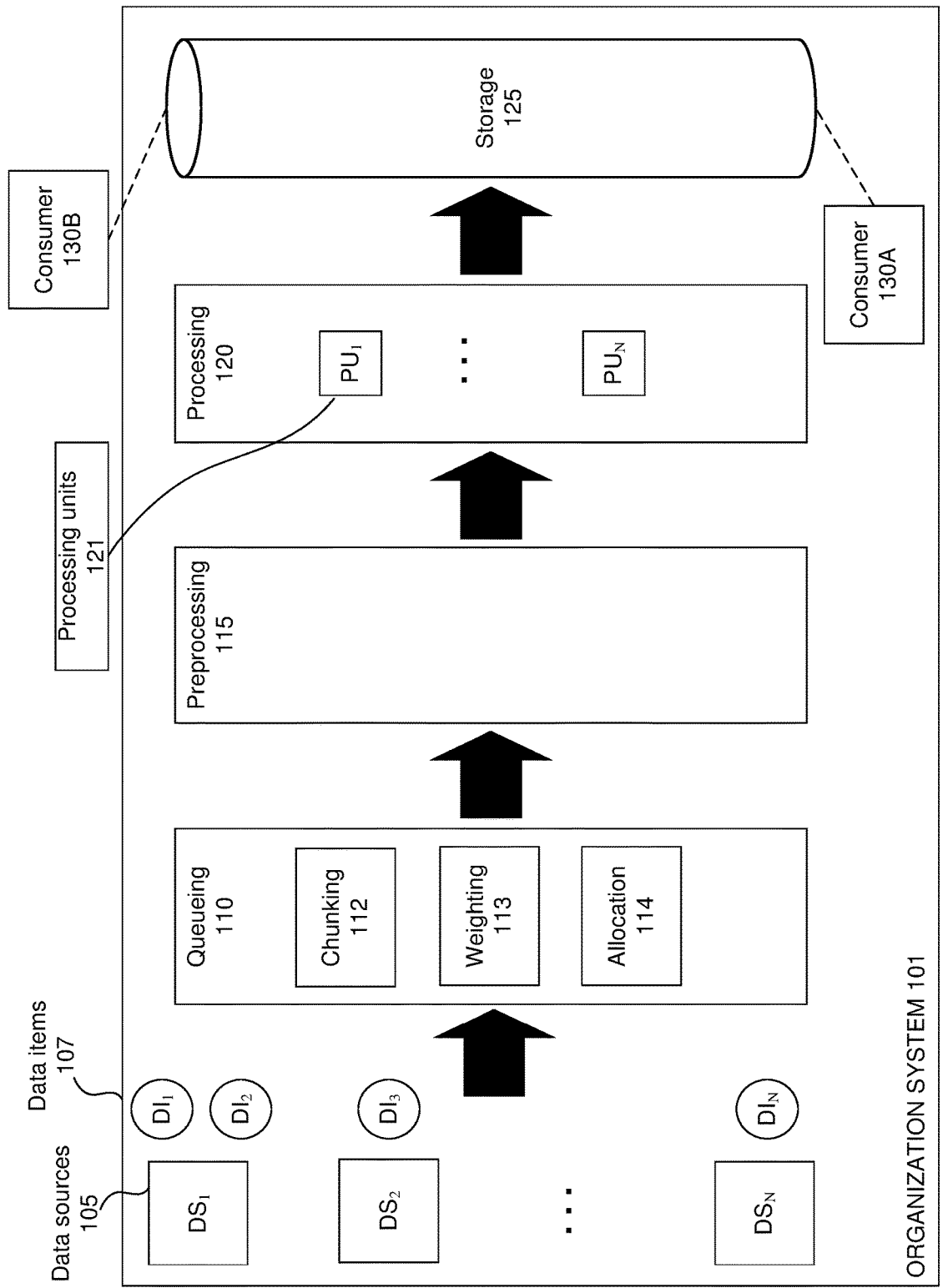
FIG. 1 illustrates a processing environment in which an organization promptly and efficiently processes data items of source data for access to consumer clients, according to one embodiment.

FIG. 1 illustrates a processing environment in which an organization promptly and efficiently processes data items of source data for access to consumer clients, according to one embodiment. A very large number of data items are generated within (or otherwise available to) the organization's system 101. The organization's system uses a queuing subsystem 110 to allocate processing of the data items in a sequence of prioritized chunks, allocated among the various processing units available to the organization system so as to efficiently distribute the processing load.

The organization system 101 represents the components constituting, or used by, an organization. As illustrated in FIG. 1, the organization system 101 has (or has access to) a number of data sources 105 and their associated data items 107. The data items 107 are input to a queuing subsystem 110, which chunks (groups) the data items and allocates the chunked items to a preprocessing subsystem 120. (Optionally, as illustrated in FIG. 1, before being processed by the processing subsystem 120 the data items may first be preprocessed by a preprocessing subsystem 115.) The output of the processing subsystem 120 is stored in a storage subsystem 125, where it is available to consumer clients 130. The clients may be part of the organization system 101, such as consumer client 130A (e.g., a computer program of a data analyst employed by the organization), or a third-party, external client, such as consumer client 130B (e.g., a third-party industry analyst or a program thereof). These various components are now described in additional detail.

A number of data sources 105 collectively provide a set of data items 107, which together constitute the source data to be processed. The data sources 105 may be located at different locations over a computer network, such as on different physical machines within a data center of the organization system 101, or within a cloud storage provider used by the organization, for example. The data items 107 represent distinct units of information, such as log files. Each data item has one or more attributes, such as an associated date and/or time (e.g., a file creation date, for data items represented by digital files), a data size in the bytes, or the like. The data items 107 are in a semi-structured (e.g., files with some organization, but lacking a precise schema) or unstructured (e.g., text files permitting arbitrary data layout) format not suitable for direct querying. This contrasts with structured data (e.g., data in a relational database management system), which has a schema that precisely defines the units of semantic information within the data items.

The queuing subsystem 110 takes the data items 107 as input and determines an order in which to assign them to processing units, as well as which processing units to assign them to. In order to determine a coarse-grained order of assignment for the various data items 107, the queuing subsystem 110 has a chunking module 112 that determines a chunking attribute value for each data item 107 and groups the data items into groups using the chunking attribute value. In some embodiments the chunking module 112 uses a single attribute of the data items 107 as the chunking attribute; in other embodiments, the chunking module 112 instead determines a value for the chunking attribute as an aggregate of values of other attributes of the data item 107. The chunking attribute is of a type whose values can be ordered in a sequence, such as dates/times, numbers, letters, or the like. The chunking module 112 uses different techniques in different embodiments to perform the chunking, such as identifying a sequence of equally-sized ranges of the chunking attribute value (e.g., consecutive ranges of a size determined by a time granularity interval for a chunking attribute based on date). In such cases, the range size is referred to as the chunk size. In other embodiments, the chunking module 112 uses a clustering algorithm, such as a k-means clustering algorithm, rather than fixed chunk sizes.

The queuing subsystem 110 further includes a weighting module 113 that assigns, for each chunk, a weight to each data item within that chunk. The weight indicates an expected amount of time, or amount of processing operations, required to process the data item by the processing subsystem 120. In some embodiments, the expected amount of time is represented by the size in bytes of a data item, on the assumption that on average the time to process a data item varies linearly with its size in bytes. In other embodiments, the expected amount of time is computed with other types of techniques, such as by comparing to historical data about past processing times (e.g., by using a machine learning technique to train a model for estimating computation time based on attributes such as file size, file name, file type, user ID of user associated with the computation task, time/date of computation, or the like).

The queuing subsystem 110 additionally includes an allocation module 114 that assigns the data items 107 of the chunks in order of their chunking attributes. For example, in some embodiments using date as the chunking attribute, the allocation module 114 first assigns the data items of chunks with more recent dates before those with less recent dates. Within a given chunk, the allocation module 114 assigns the data items of that chunk in order of their weights representing the respective expected amounts of processing time for the data items, such as with larger weights first.

The assignment of a given data item to a processing unit of the processing subsystem 120 attempts to distribute processing load equally among all processing units. Specifically, the allocation module 114 initially assigns a load value of 0 to each processing unit, indicating that no work has yet been assigned to any of the processing units. When assigning processing of a data item to a processing unit, the allocation module 114 assigns the processing to the processing unit having the lowest current load value, and then adds an expected amount of processing time for the data item to that processing unit. In some embodiments, if the processing units differ in processing abilities, and the relative processing abilities are known, this may be taken into account by the allocation module 114 when adding the expected amount of processing time, as a form of normalization among the processing units. For example, if processing unit $P_1$ has 50% greater processing ability than processing unit $P_2$, and $P_2$ has an average amount of processing ability among the processing units, then a task estimate that takes 15 units of processing time for $P_1$ could be scaled by a factor of $(1/1.5)$ when adding it to the task queue of $P_1$, so that only 10 units of processing time are allocated to $P_1$. This takes relative processor abilities into consideration when equally spreading the processing load. The processing subsystem 120 may additionally and/or alternatively distribute the processing load to minimize monetary cost (rather than processing time). As another example, in the case of cloud-based computation, if the cloud computation service charges different amounts, or has different cost structures (e.g., on-demand vs. reserved), for different processing units, this can additionally and/or alternatively be taken into account when distributing the load, e.g., distributing less of the computation to processing units with higher costs.

In some embodiments, a preprocessing subsystem 115 converts the data items 107 to a format expected by the processing code running on the processing units 121. This provides a greater degree of abstraction by allowing client code to provide data in different formats, relying on the preprocessing subsystem 115 (rather than the code used by the processing subsystem 120) to handle such different formats. Such preprocessing may make place before, after, or concurrent with the queuing performed by the queueing subsystem 110.

The processing subsystem 120 performs the desired processing operations on the data items, and is composed of the various processing units 121 to which the processing of the various data items 107 is assigned. The processing units 121 need not be individual processors, or even individual systems with multiple processors, but may also be logical processing units within a data center or cloud computing infrastructure, such as a Hadoop cluster of networked nodes used to perform parallel computations on the large data set made up by the data items 107.

The processing units 121 of the processing subsystem 120 run code (e.g., code written by employees of the organization) that processes the data items 107 in whatever manner is desired. As one simple example in which the data items 107 are log files of financial transactions, the processing subsystem 120 might include code that evaluates the set of data items and computes the total count of transactions over different periods of time. The processing subsystem 120 may run any number of different code programs to perform the different analyses desired by the organization.

The output of the processing subsystem 120 is stored within a storage subsystem 125. The formed of the stored output have a greater degree of structure than the original data items 107. For example, where the data items 107 may have been unstructured or semi-structured (e.g., purely textual data such as log files), the output in the storage subsystem 125 may be highly structured (such as in a relational database management system (RDBMS) form, or at least in a format that is more suitable for executing queries. In some embodiments, for example, the storage subsystem 125 includes a Hadoop Distributed Filesystem (HDFS) that can directly support Structured Query Language (SQL) queries.

The consumer clients 130 are software programs executed by those who are interested in the results of the processing subsystem 120 that are stored in the storage subsystem 125, and who have been granted access to that data by the organization. As noted above, the consumer clients 130 may be internal clients that are part of the organization itself, or they may be external entities that have been granted access. The consumer clients 130 may use the data in the storage subsystem 125 for numerous purposes. As one specific example, a data scientist of the organization may write a program for a consumer client 130A that analyzes all the data items 107 over a particular time interval (where, as in above examples, the data items represent financial transactions), identifying data for financial transactions that failed, deriving features for those transactions, and providing the features to a machine learning training algorithm that produces a model for identifying transactions that are likely to fail. The data scientist can then employ the trained model to flag in real time the transactions that will likely not be completed and take action accordingly. As another specific example, code for a photo-sharing system might accept the upload of a large batch of photos, uploading them over the network and storing them on disk in order of creation date (newest to oldest), with photo-sharing website code rendering them to the user's web page as soon as they are processed and uploaded.

Note that components illustrated in FIG. 1 as being within the organization system 101 need not be located within the physical control of the organization, such as within its internal network, but may instead be externally-administered components of other organizations. Thus, some or all of the physical or virtual infrastructure of the organization system 101 could be provided by cloud providers, rather than being part of on-premises data centers. Additionally, different logical component could be combined in a particular embodiment. For example, the data items 107 and the output of the processing subsystem 120 could all be stored within the storage subsystem 125. Similarly, any or all the processing components 110, 115, 120, and 130 could execute on the same system (e.g., within a virtual cloud system).

Components of the organization system 101 may be connected by any computer network suitable communications network for data transmission. For example, the network may use standard communications technologies and/or protocols and can include the Internet. In another embodiment, the entities use custom and/or dedicated data communications technologies.

Figure 2:
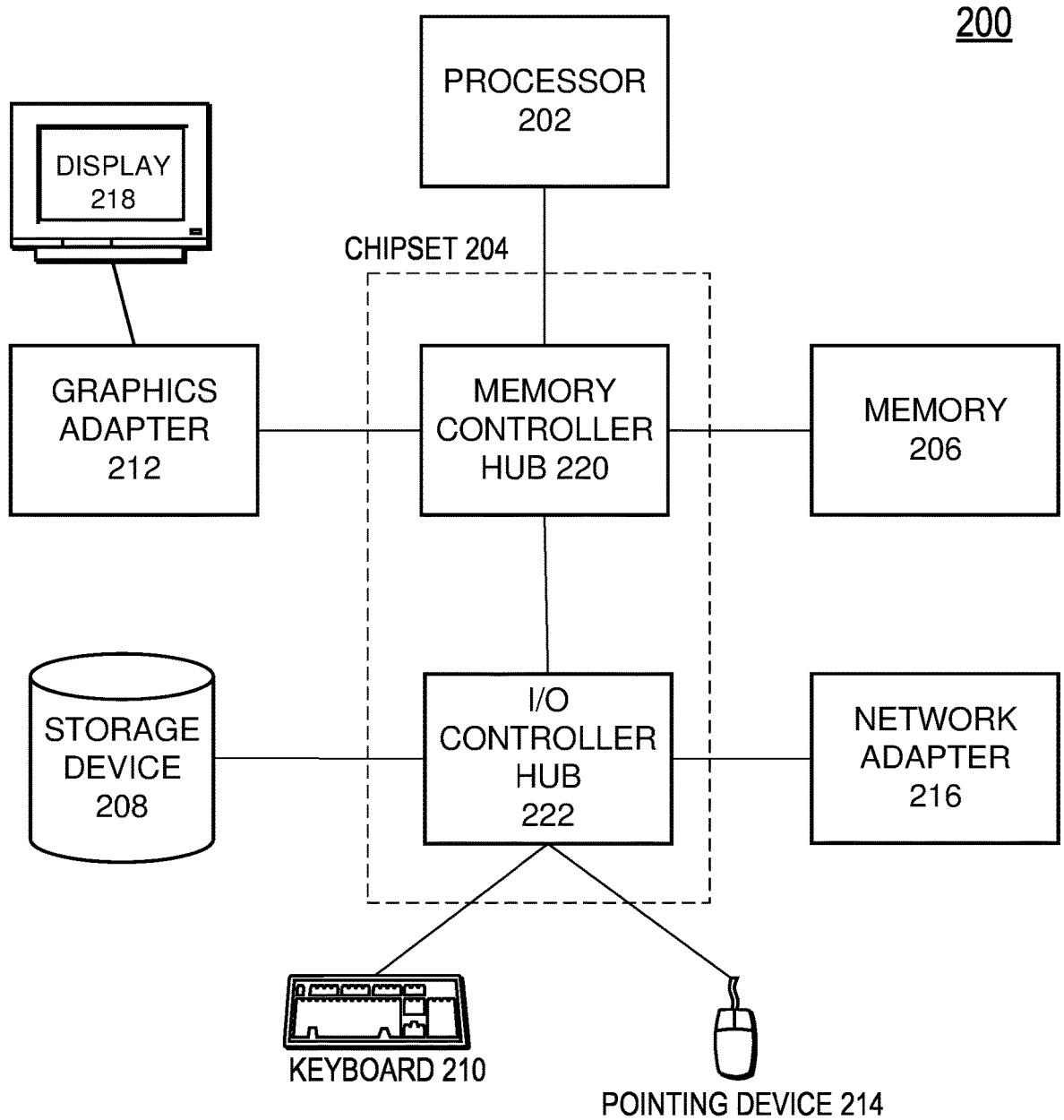
FIG. 2 is a high-level block diagram illustrating physical components of a computer used as part of the organization system from FIG. 1, according to one embodiment.

FIG. 2 is a high-level block diagram illustrating physical components of a computer 200 used as part of the organization system from FIG. 1, according to one embodiment. Illustrated are at least one processor 202 coupled to a chipset 204. Also coupled to the chipset 204 are a memory 206, a storage device 208, a graphics adapter 212, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The graphics adapter 212 displays images and other information on the display 218. The network adapter 216 couples the computer 200 to a local or wide area network.

As is known in the art, a computer 200 can have different and/or other components than those shown in FIG. 2. In addition, the computer 200 can lack certain illustrated components. In one embodiment, a computer 200 acting as a server may lack a graphics adapter 212, and/or display 218, as well as a keyboard or pointing device. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

One possible embodiment has been described herein. Those of skill in the art will appreciate that other embodiments may likewise be practiced. First, the particular naming of the components and variables, capitalization of terms, the attributes, data structures, or any other programming or structural aspect is not mandatory or significant, and the mechanisms described may have different names, formats, or protocols. Also, the particular division of functionality between the various system components described herein is merely for purposes of example, and is not mandatory;

functions performed by a single system component may instead be performed by multiple components, and functions performed by multiple components may instead be performed by a single component.

Some portions of the above description present the inventive features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects described herein include process steps and instructions in the form of an algorithm. It should be noted that the process steps and instructions could be embodied in software, firmware or hardware, and when embodied in software, could be downloaded to reside on and be operated from different platforms used by real time network operating systems.

The concepts described herein also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the concepts described herein are not described with reference to any particular programming language. It is appreciated that a variety of programming languages may be used to implement the teachings as described herein, and any references to specific languages are provided for purposes of enablement and best mode.

The concepts described herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the concepts described herein, which are set forth in the following claims.

What is claimed is:

1. A computer-implemented method comprising:
    accessing a set of files in a semi-structured or unstructured format across a plurality of distributed computer systems, wherein:
        the files are sorted according to dates corresponding to the files,
        each date indicates a date the respective file was created,
        the files are grouped into chunks according to the dates and a given date range size,
        respective expected amounts of time required to process the files are based on using a machine learning model trained on features of historical training data,
        the features of the historical training data include observed amounts of processing time for historical files in the historical training data and at least one of: file sizes of the historical files, file names of the historical files, file types of the historical files, times at which processing of the historical files occurred, or a user identification of a user associated with the times, and;
        the files within the chunks are further sorted according to the respective expected amounts of time;
    processing the sorted files within the chunks by processing units of a processing subsystem based on an iterative allocation of the files according to the dates and the respective expected amounts of time across the processing units to a processing unit having a lowest current computing load, wherein the computing load of the processing unit having the lowest current computing load is updated according to the respective expected amount of time to process the respective file and a processing ability of the processing unit; and
    storing results of the processing within a structured database, wherein the results are available to consumers.

2. The computer-implemented method of claim 1, wherein the given date range size is a fixed size.

3. The computer-implemented method of claim 1, wherein the iterative allocation of the files is further based on a normalization of the expected amounts of time using a scaling factor representing relative processing abilities of the processing units.

4. The computer-implemented method of claim 1, wherein a size of the chunks is based on a k-means clustering algorithm.

5. The computer-implemented method of claim 1, wherein an average time to process a file varies linearly with a size of the file.

6. The computer-implemented method of claim 1, wherein the iterative allocation of the files further allocates the files with more recent dates before those with less recent dates.

7. The computer-implemented method of claim 1, wherein the files are converted to a format expected by processing code running on the respective processing units before the files are processed by the respective processing units.

8. The computer-implemented method of claim 1, wherein the processing units are at least one of: individual processors, individual systems with multiple processors, and logical processing units within a data center or cloud computing infrastructure.

9. The computer-implemented method of claim 1, wherein the files are log files of financial transactions.

10. The computer-implemented method of claim 1, wherein the files are stored in order of newest to oldest creation date.

11. A computer system comprising:
a computer processor; and
memory storing instructions that when executed by the computer processor execute a method comprising:
accessing a set of files in a semi-structured or unstructured format across a plurality of distributed computer systems, wherein:
the files are sorted according to dates corresponding to the files,
each date indicates a date the respective file was created,
the files are grouped into chunks according to the dates and a given date range size,
respective expected amounts of time required to process the files are based on using a machine learning model trained on features of historical training data,
the features of the historical training data include observed amounts of processing time for historical files in the historical training data and at least one of: file sizes of the historical files, file names of the historical files, file types of the historical files, times at which processing of the historical files occurred, or a user identification of a user associated with the times, and
the files within the chunks are further sorted according to the respective expected amounts of time;
processing the sorted files within the chunks by processing units of a processing subsystem based on an iterative allocation of the files according to the dates and the respective expected amounts of time across the processing units to a processing unit having a lowest current computing load, wherein the computing load of the processing unit having the lowest current computing load is updated according to the respective expected amount of time to process the respective file and a processing ability of the processing unit; and
storing results of the processing within a structured database, wherein the results are available to consumers.

12. The computer system of claim 11, wherein the given date range size is a fixed size.

13. The computer system of claim 11, wherein the iterative allocation of the files is further based on a normalization of the expected amounts of time using a scaling factor representing relative processing abilities of the processing units.

14. The computer system of claim 11, wherein a size of the chunks is based on a k-means clustering algorithm.

15. The computer system of claim 11, wherein an average time to process a file varies linearly with a size of the file.

16. The computer system of claim 11, wherein the iterative allocation of the files further allocates the files with more recent dates before those with less recent dates.

17. The computer system of claim 11, wherein the files are converted to a format expected by processing code running on the respective processing units before the files are processed by the respective processing units.

18. The computer system of claim 11, wherein the processing units are at least one of: individual processors, individual systems with multiple processors, and logical processing units within a data center or cloud computing infrastructure.

19. The computer system of claim 11, wherein the files are log files of financial transactions.

20. The computer system of claim 11, wherein the files are stored in order of newest to oldest creation date.

* * * * *

UNITED STATES PATENT AND TRADEMARK OFFICE
CERTIFICATE OF CORRECTION

PATENT NO. : 12,333,345 B2  
APPLICATION NO. : 17/576884  
DATED : June 17, 2025  
INVENTOR(S) : Ramasamy et al.

Page 1 of 1

It is certified that error appears in the above-identified patent and that said Letters Patent is hereby corrected as shown below:

In the Claims

In Column 8, in Claim 1, Line 34, delete "and;" and insert -- and --, therefor.

Signed and Sealed this  
Twelfth Day of August, 2025

Coke Morgan Stewart  
*Acting Director of the United States Patent and Trademark Office*